United States Patent
Fujimori et al.

(10) Patent No.: US 8,000,232 B2
(45) Date of Patent: Aug. 16, 2011

(54) METHOD FOR CONTROLLING REDUNDANCY AND TRANSMISSION DEVICE USING THE SAME

(75) Inventors: Tomoyoshi Fujimori, Kawasaki (JP); Satoru Saitoh, Kawasaki (JP); Hiroyuki Honma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1320 days.

(21) Appl. No.: 11/315,585

(22) Filed: Dec. 23, 2005

(65) Prior Publication Data
US 2007/0081451 A1 Apr. 12, 2007

(30) Foreign Application Priority Data
Sep. 29, 2005 (JP) .................. 2005-285421

(51) Int. Cl.
*G06F 11/20* (2006.01)
(52) U.S. Cl. ........ 370/225; 370/221; 370/222; 370/223; 370/226; 370/227; 370/228; 370/242; 370/246; 340/2.9; 340/3.43; 340/3.44; 714/3; 714/4.1; 714/4.11; 714/4.12; 379/4
(58) Field of Classification Search .......... 370/221–228, 370/242, 246, 279, 315, 492, 501; 340/825.01, 340/2.9, 3.43, 3.44; 379/4; 714/3–4, 4.1, 714/4.11, 4.12
See application file for complete search history.

(56) References Cited

U.S. PATENT DOCUMENTS

| | | |
|---|---|---|
| 6,785,225 B1 | 8/2004 | Sugawara et al. |
| 6,920,603 B2 | 7/2005 | Kimoto |
| 7,054,265 B1 | 5/2006 | Sugawara et al. |
| 7,518,985 B2 | 4/2009 | Sugawara et al. |
| 2003/0233579 A1 | 12/2003 | Kimura et al. |

FOREIGN PATENT DOCUMENTS

| | | |
|---|---|---|
| JP | 2000-349861 A | 12/2000 |
| JP | 2004-23480 | 1/2004 |
| WO | WO-02/056513 A1 | 7/2002 |

OTHER PUBLICATIONS

Corrigent Systems, Adding RPR and MPLS to Existing SONET using Virtual Concatenation and GFP, Nov. 23, 2003, Corrigent Systems.*
Ramfelt et al., RPR Protection Switching, Mar. 2001, Dynarc.*
Busi et al., Proposed Draft Standard for Resilient Packet Ring Access Method & Physical Layer Specifications—Draft 0.1, Jan. 2002, IEEE.*
Japanese Notice of Reason(s) for Rejection, Partial English-language Translation, mailed Mar. 8, 2011 for corresponding Japanese Application No. 2005-285421.
Japanese Office Action, Partial English-language translation, mailed Oct. 19, 2010 for corresponding Japanese Application No. 2005-285421.

* cited by examiner

*Primary Examiner* — Aung S Moe
*Assistant Examiner* — Hoon J Chung
(74) *Attorney, Agent, or Firm* — Fujitsu Patent Center

(57) ABSTRACT

A redundancy control method is disclosed that controls a first redundancy function that switches between a working line and a protection line in response to a detection of a line error and a second redundancy function that performs a path switching in response to a detection of a path error in a ring network operating at a path rate lower than a line rate thereof. The method comprises a step of masking the path error detection within a period from a time of the detection of the line error to an expected time of the detection of the path error.

6 Claims, 18 Drawing Sheets

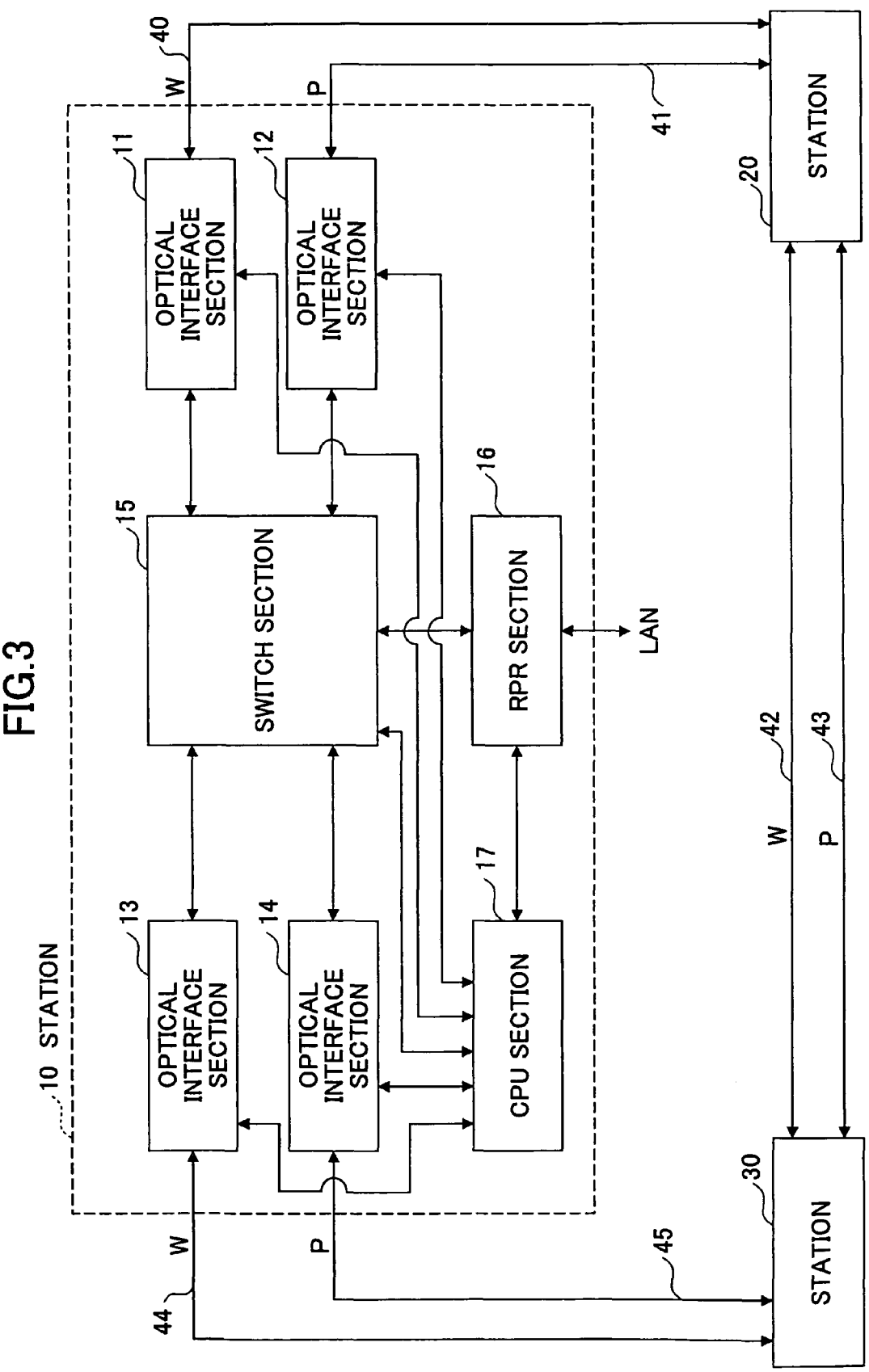

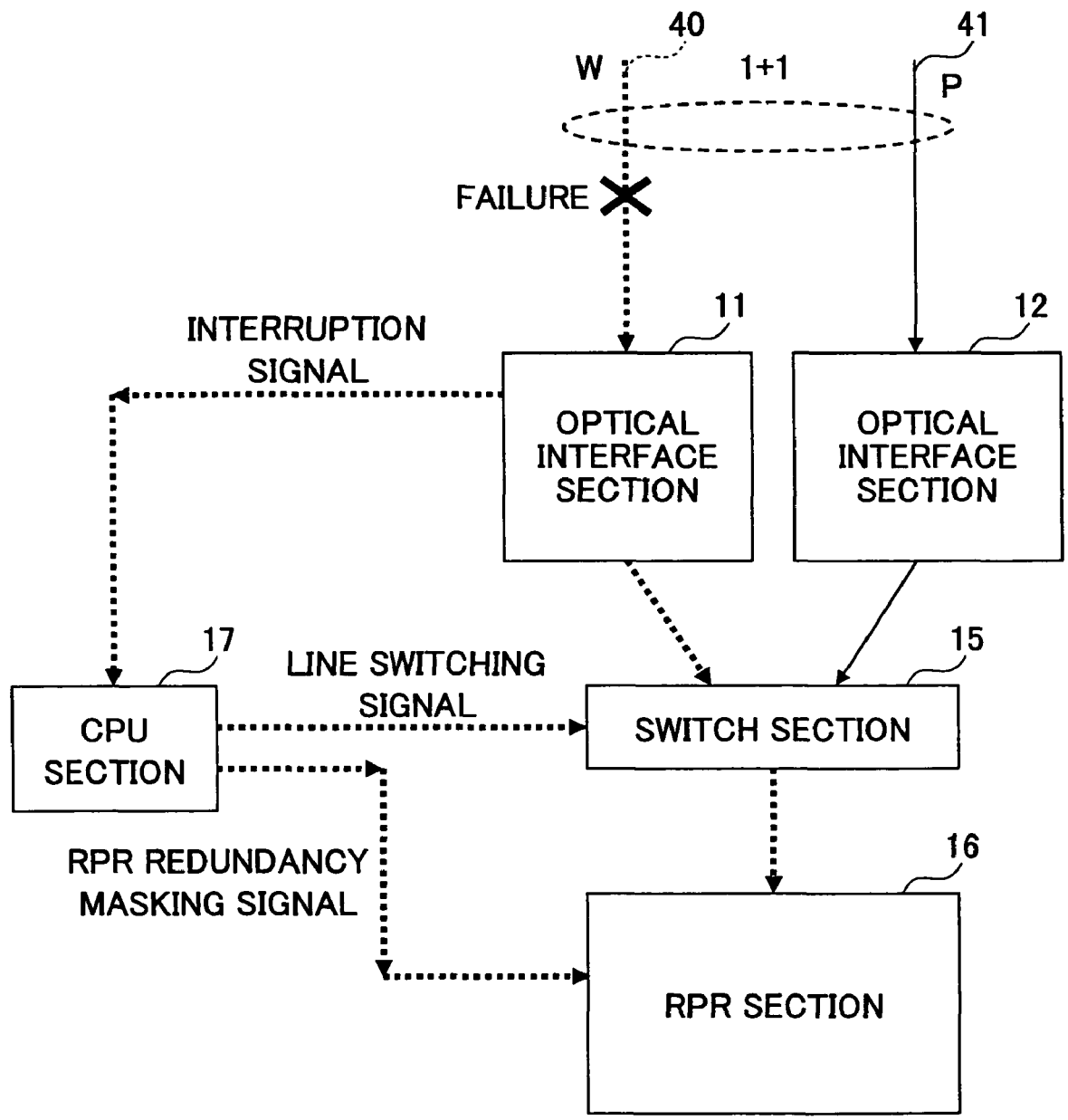

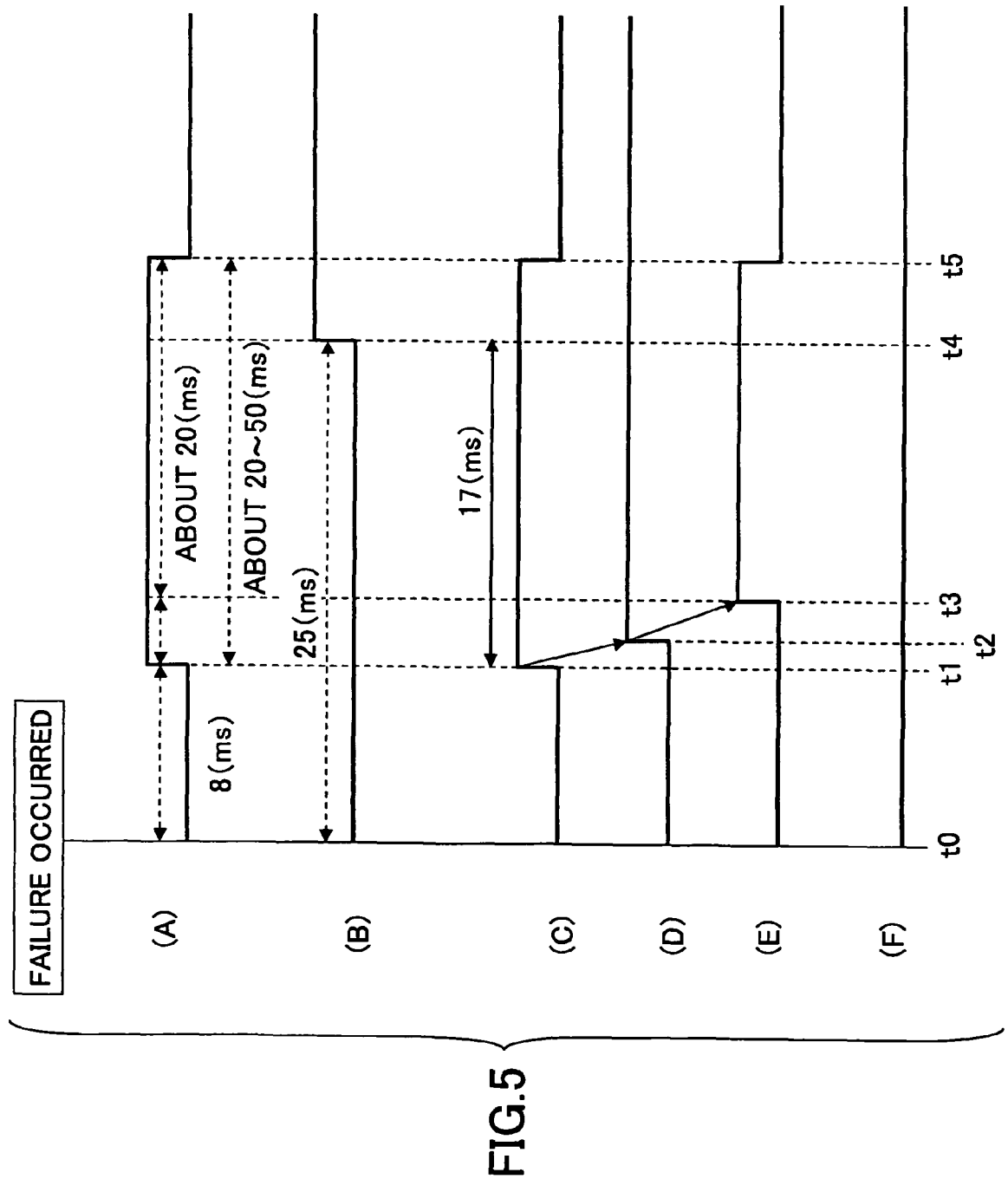

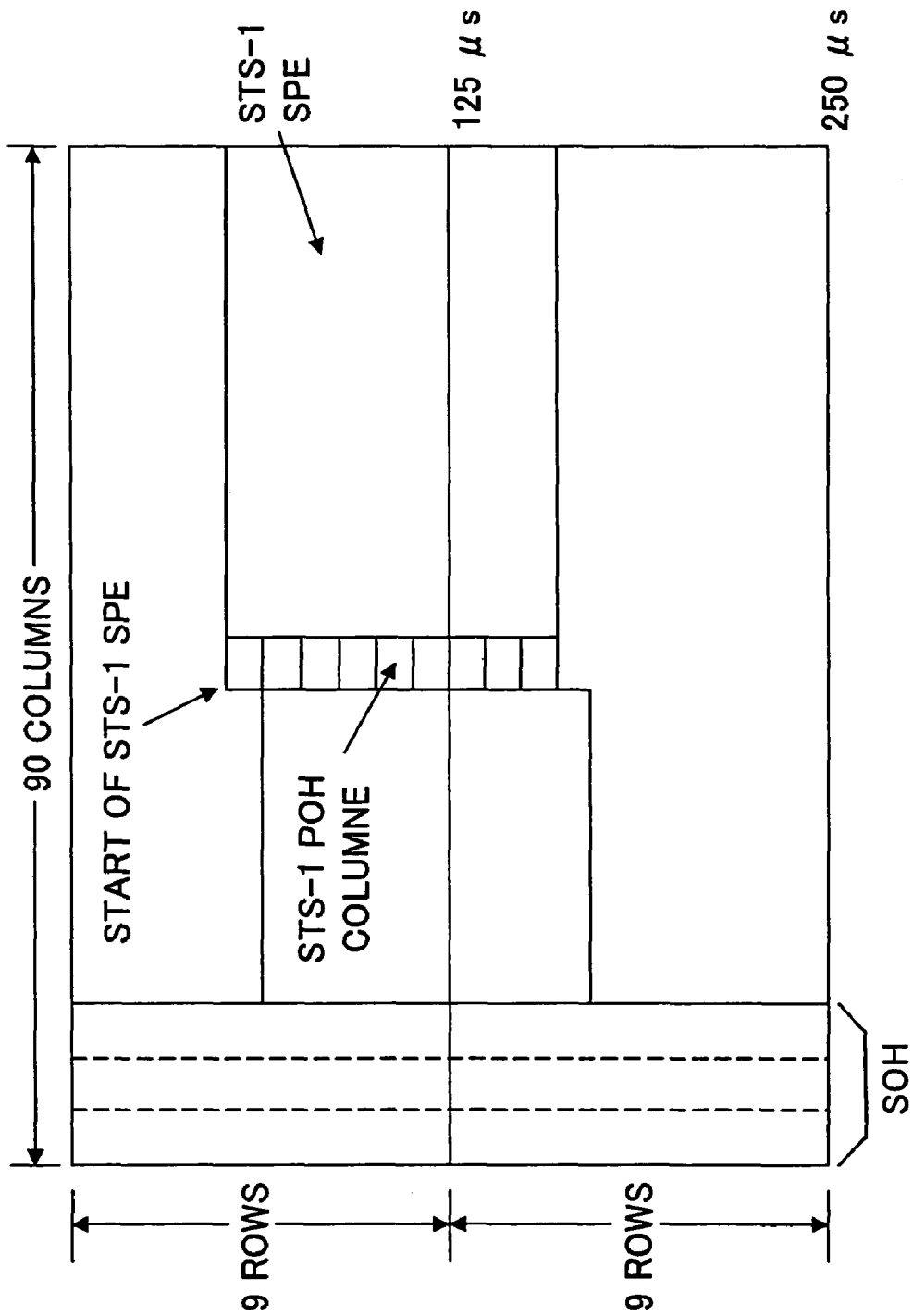

METHOD FOR CONTROLLING REDUNDANCY AND TRANSMISSION DEVICE USING THE SAME

BACKGROUND OF THE INVENTION

1. Field of the Invention

The present invention generally relates to a method for controlling redundancy and a transmission device, and particularly relates to a method for controlling redundancy and a transmission device for use in a ring network operating at a path rate lower than a line rate thereof.

2. Description of the Related Art

In recent years, there has been a growing demand for IP networks with greater reliability. RPR (Resilient Packet Ring) having a ring switching function for LAN (the term "LAN" as used herein includes WAN and MAN as well as LAN) is one promising technology to improve the reliability of the IP networks. In RPR networks, Ethernet™ frames are encapsulated in RPR frames. The RPR redundancy employs a steering method and a wrapping method, which are standardized in IEEE 802.17. Path failure information is transmitted between stations using control frames, thereby achieving reliability close to that of synchronous transmission systems such as SONET (Synchronous Optical Network) and SDH (Synchronous Digital Hierarchy). It is understood that the term "SONET" is used hereinafter as short for "SONET/SDH".

On the other hand, SONET communications networks provide SONET redundancy, in which a working (W) line is switched to a protection (P) line when a failure occurs on the working line, and the protection line is switched back to the working line when the failure is recovered from.

The existing infrastructure for the SONET communications networks is huge.

Currently, it is believed that using the existing SONET infrastructure is an effective way to readily and efficiently deploy the above-described RPR technology. However, if the RPR ring network is formed with use of the existing SONET infrastructure as a physical layer, both the SONET redundancy function and the RPR redundancy function are activated in the event of failure, resulting in a conflict.

In view of this problem, Patent Document 1 discloses a method for controlling the conflict between the SONET redundancy function and the RPR redundancy function by statically switching two modes with use of SONET overhead. In one mode, the RPR redundancy function is disabled while a BLSR (Bi-directional Line-Switched Ring) redundancy function, which is one of the SONET redundancy functions, is enabled. In the other mode, the RPR redundancy function is enabled while the BLSR redundancy function is disabled.

[Patent Document 1] Japanese Patent Laid Open Publication No. 2004-23480

FIGS. 1A-1C are block diagrams illustrating a related-art RPR over SONET network in which the existing SONET infrastructure is used as a physical layer. Referring to FIG. 1A, stations 1, 2, and 3 form a ring network through working (W) lines and protection (P) lines. The station 1 sends a data item α to the station 3, and a data item β to the station 2.

If a failure occurs on the working (W) line between the stations 1 and 2 as shown in FIG. 1B, the following operations are performed. With reference to FIGS. 1B and 2A, in the station 2, an optical interface section 4 detects a line error on the working (W) line and reports the line error to a CPU section 6. The CPU section 6 activates a SONET redundancy function such that connection to an RPR section 8 is switched by a switch section 7 from the optical interface section 4 for the working (W) line to an optical interface section 5 for the protection (P).

Once a SONET redundancy operation is completed by the SONET redundancy function in this way, a path of the RPR is restored. However, the RPR section 8 of the station 2 detects a path error before the completion of the SONET redundancy operation, so that an RPR redundancy function is activated although not needed.

When the RPR redundancy function is activated, a transmission route for the data item β is switched to a route of the station 1—the station 3—the station 2 as shown in FIG. 1C. Therefore, the available bandwidth between the station 1 and 3 decreases. Moreover, the unwanted activation of the RPR redundancy function causes a temporary signal interruption.

When the failure is recovered from, the following operations are performed. Referring to FIG. 2B, when a command is input or when a WTR (Wait To Restore) state is over, the CPU section 6 sends a signal such that the switch section 7 switches back connection from the optical interface section 5 for the protection (P) line to the optical interface section 4 for the working (W) line. Because a pointer is relocated during the switchback from the optical interface section 5 to the optical interface section 4, the RPR section 8 detects a path error due to the pointer relocation. As a result, the RPR redundancy function is activated although not needed.

As described above, although a path failure is recovered from by the SONET redundancy operation, the unwanted activation of the RPR redundancy function causes reduction of available bandwidth and temporary interruption of signals.

It may be a solution to this problem to increase the delay time of the activation of the RPR redundancy function with respect to the detection of the path failure using an RPR hold off timer; With this method, however, activation of the RPR redundancy function with the increased delay is applied even when RPR redundancy is really needed.

Turning back to the method disclosed in Patent Document 1, if both the working line and the protection line fail, i.e., if a double failure occurs in the mode where the RPR redundancy function is disabled, the RPR redundancy function cannot be activated.

SUMMARY OF THE INVENTION

The present invention solves at least one problem described above.

According to one aspect of the present invention, there is provided a redundancy controlling method and a transmission device using the same, capable of preventing reduction of available bandwidth and temporary signal interruption due to unwanted activation of an RPR redundancy function.

According to another aspect of the present invention, there is provided a redundancy controlling method for controlling a first redundancy function that switches between a working line and a protection line in response to a detection of a line error and a second redundancy function that performs a path switching in response to a detection of a path error in a ring network operating at a path rate lower than a line rate thereof, the method comprising a step of masking the path error detection within a period from a time of the detection of the line error to an expected time of the detection of the path error. This method makes it possible to prevent reduction of available bandwidth and temporary signal interruption due to unwanted activation of the second redundancy function.

It is preferable that the redundancy controlling method described above further comprise a step of stopping masking the path error detection so as to enable the second redundancy function if a line error is detected on the protection line after the switching by the first redundancy function from the working line to the protection line. This method makes it possible to handle the double errors on the working line and the protection line, i.e., a double failure, using the second redundancy function.

According to still another aspect of the present invention, there is provided a transmission device for use in a ring network operating at a path rate lower than a line rate thereof, having a first redundancy function that switches between a working line and a protection line in response to a detection of a line error, and a second redundancy function that performs a path switching in response to a detection of path error. The transmission device comprises a line error detecting unit that detects the line error on the working line and on the protection line, a switching unit that enables the first redundancy function so as to switch from the working line to the protection line in response to the detection of the line error on the working line, a path error detecting unit that detects a path error in a signal output from the switching unit, and a masking unit that masks the path error detection by the path error detecting unit within a period from a time of the detection of the line error on the working line by the line error detecting unit to an expected time of the detection of the path error by the path error detecting unit. This transmission device can prevent reduction of available bandwidth and temporary signal interruption due to unwanted activation of the second redundancy function.

In the above transmission device, it is preferable that the masking unit mask the path error detection by the path error detecting unit within a period from a start time of the switching to an expected time of the detection of the path error by the path error detecting unit when the switching unit switches back from the protection line to the working line. With this configuration, the transmission device can prevent reduction of available bandwidth and temporary signal interruption due to unwanted activation of the second redundancy function during the switchback.

In the above transmission device, it is also preferable that the masking unit' stop masking the path error detection such that the second redundancy function is enabled if the line error detecting unit detects the line error on the protection line after the switching by the switching unit from the working line to the protection line. This transmission device can handle the double failure on the working line and the protection line by using the second redundancy function.

BRIEF DESCRIPTION OF THE DRAWINGS

FIG. 3 is a block diagram illustrating an RPR over SONET network according to an embodiment of the present invention;

FIG. 4 is a block diagram illustrating operations performed upon occurrence of a failure in accordance with a redundancy controlling method of an embodiment of the present invention;

FIG. 5 is a signal timing chart for illustrating operations performed upon occurrence of a failure;

FIG. 6A illustrates a SONET synchronous transport module STS-1 format;

DETAILED DESCRIPTION OF THE PREFERRED EMBODIMENT

Figure 1A:
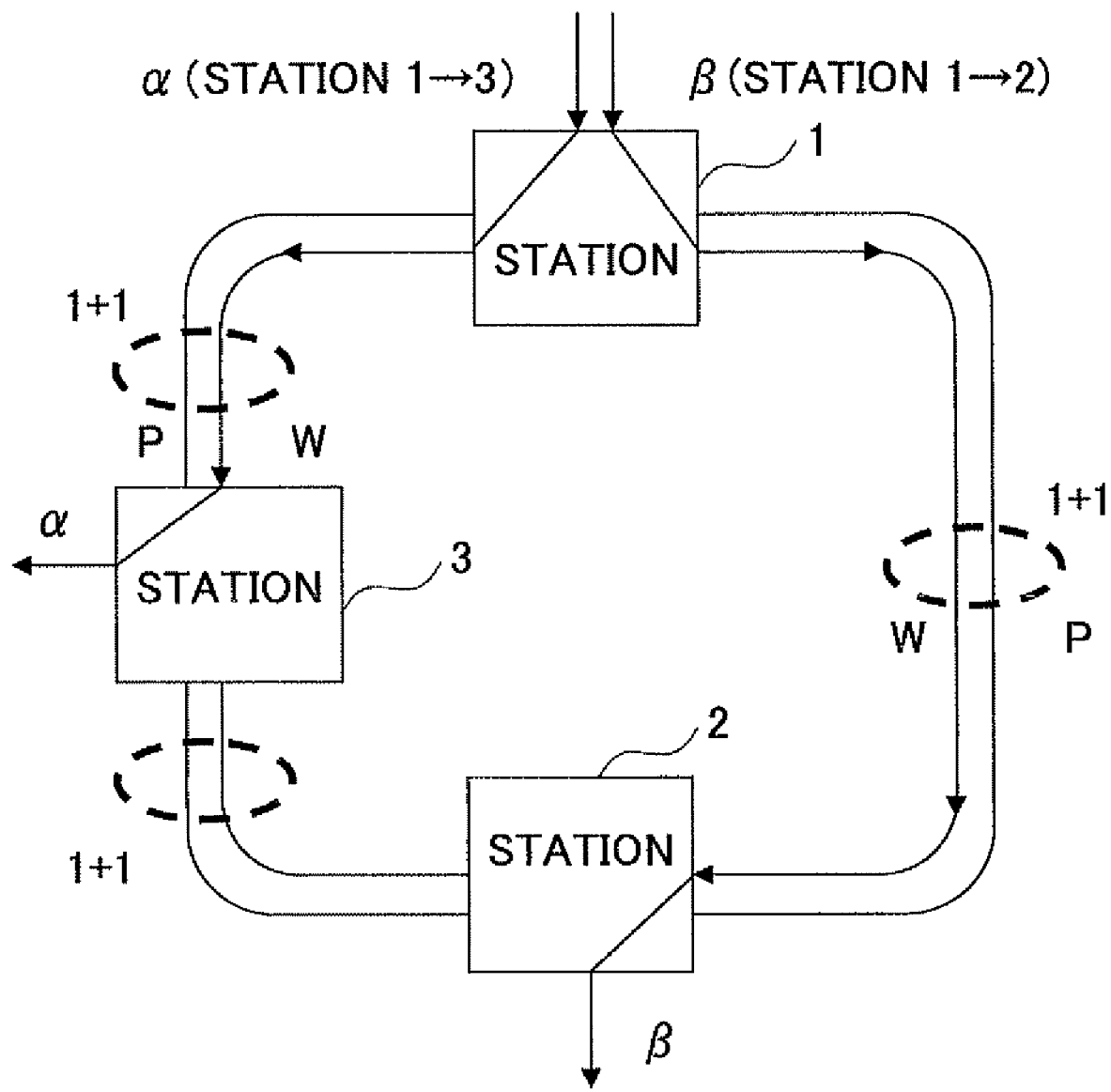
FIGS. 1A-1C are block diagrams illustrating redundancy operations of a related-art RPR over SONET network.
Figure 1B:
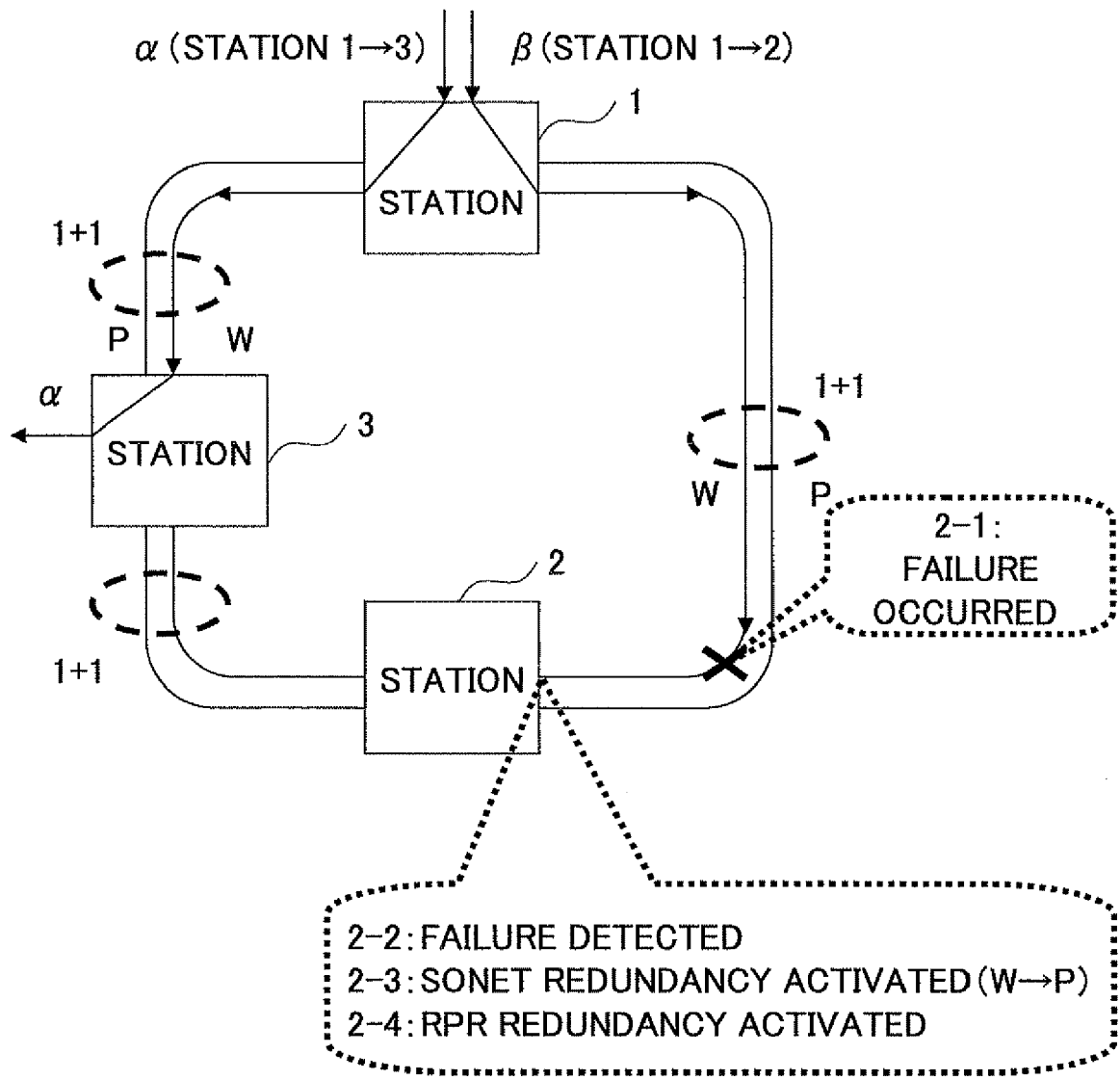
Figure 1C:
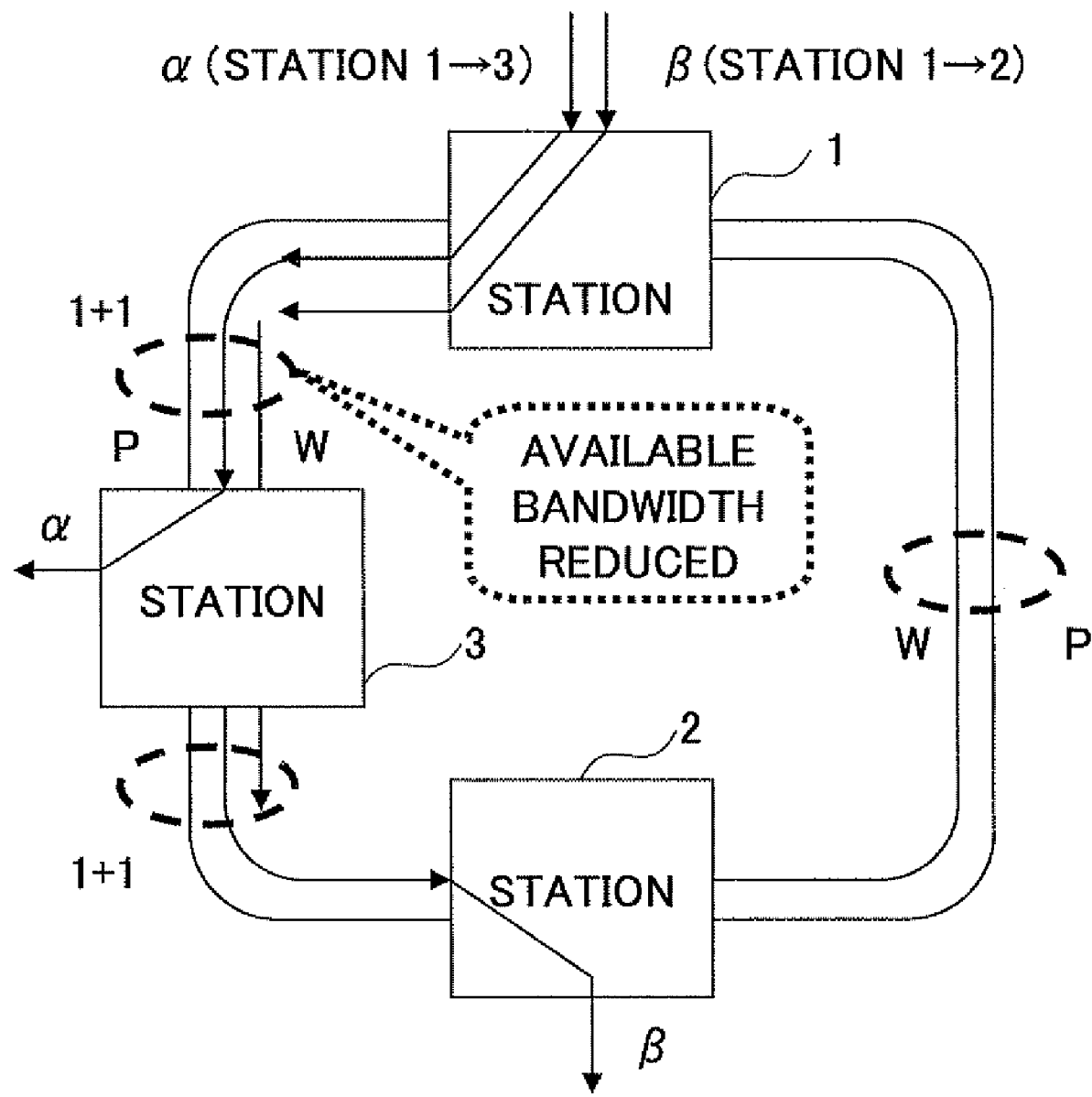
Figure 2A:
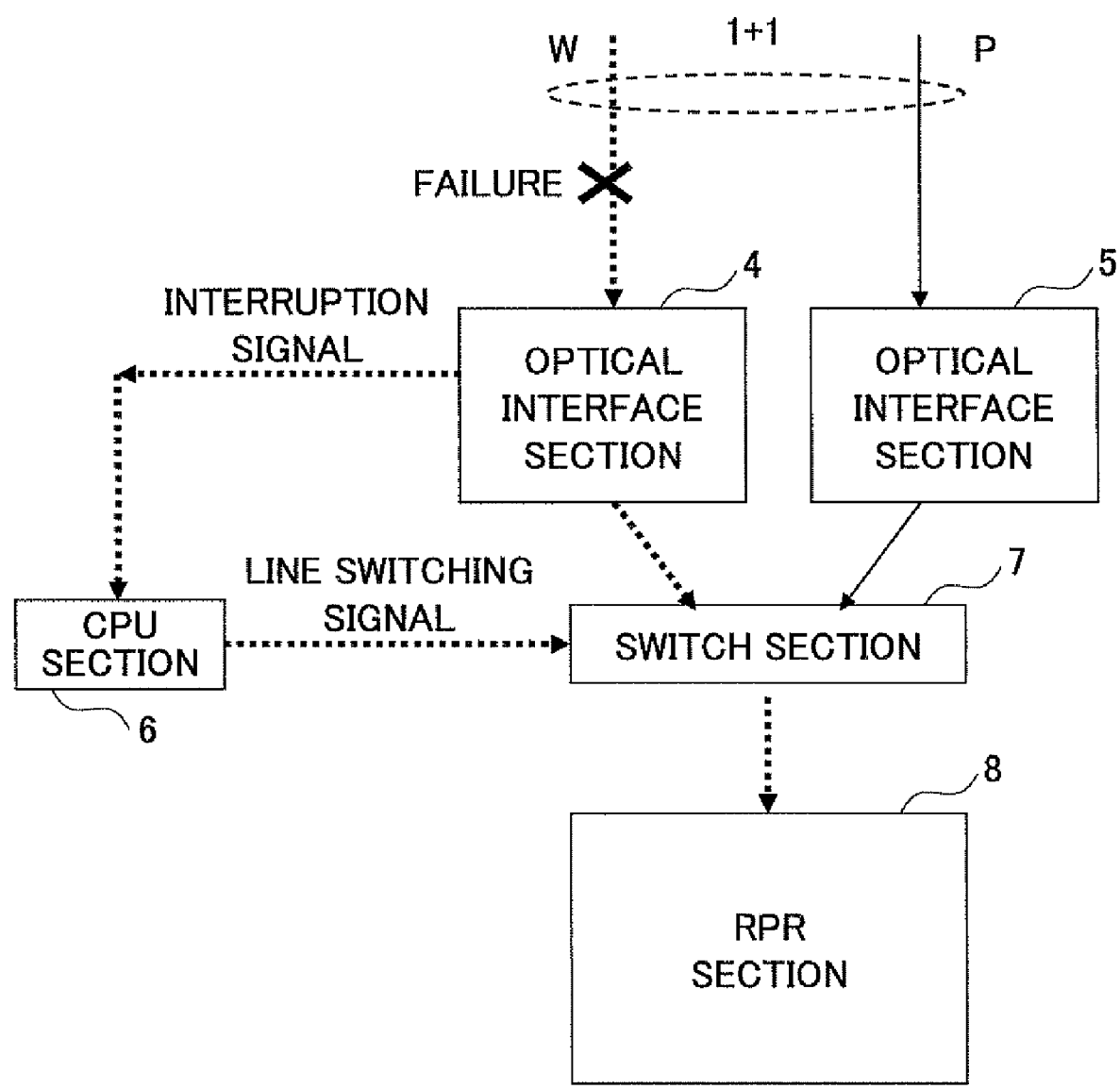
FIGS. 2A and 2B are block diagrams illustrating operations in the related-art RPR over SONET network upon occurrence and recovery of a failure.
Figure 2B:
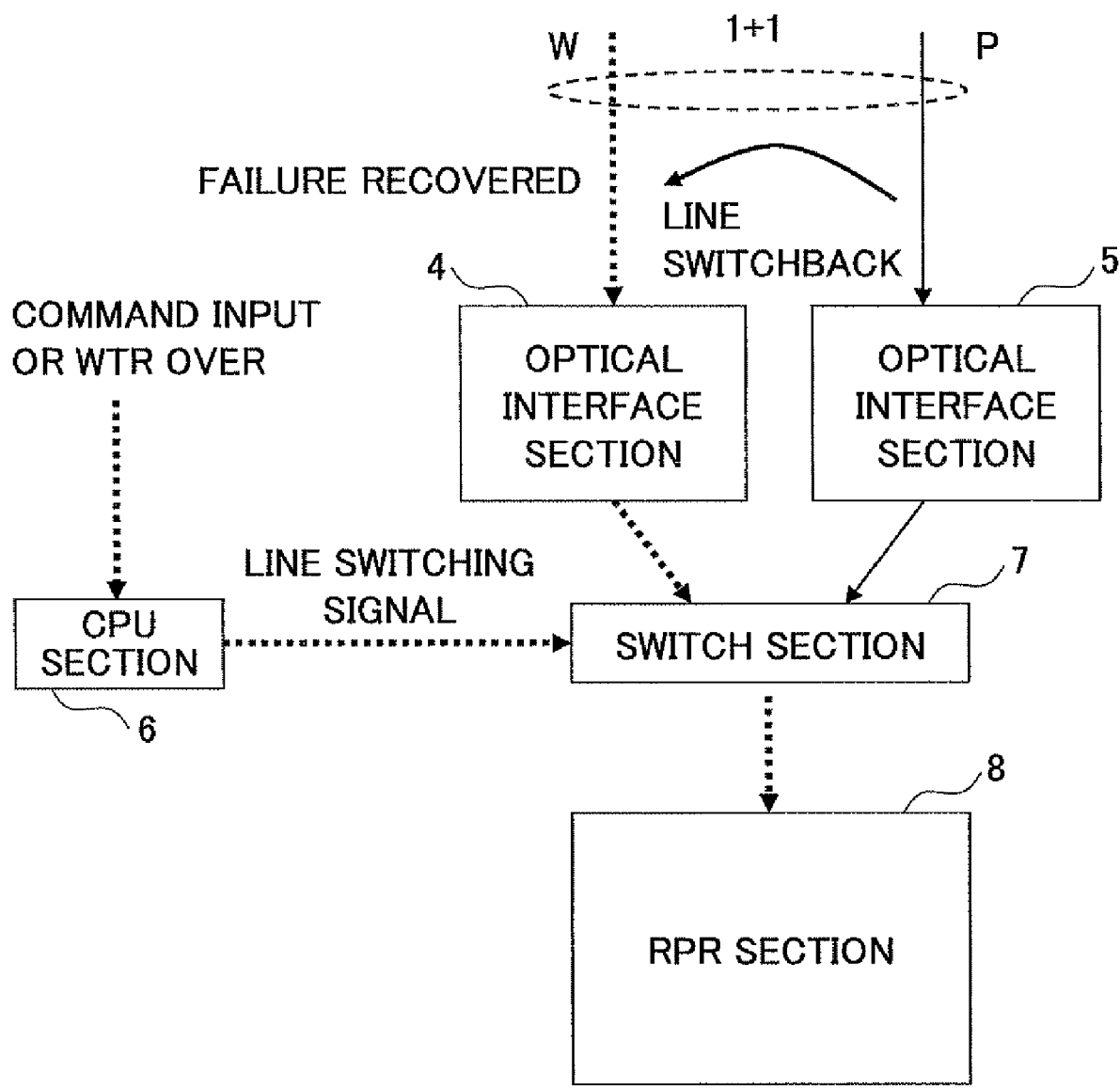

The following description provides exemplary embodiments of the present invention with reference to the accompanying drawings.

<Configuration of RPR Over SONET Network>

FIG. 3 illustrates a configuration of an RPR over SONET network according to an embodiment of the present invention. Stations 10, 20, and 30 forming the network are SONET devices. The stations 10 and 20 are interconnected through a working (W) line 40 and a protection (P) line 41. The stations 20 and 30 are interconnected through a working (W) line 42 and a protection (P) line 43. The stations 30 and 10 are interconnected through a working (W) line 44 and a protection (P) line 45. The working (W) lines 40, 42, and 44 and the protection (P) lines 41, 43, and 45 are made of optical fibers.

The stations 10, 20, and 30 have the same configuration. The station 10 comprises optical interface sections 11-14, a switch section 15, an RPR section 16, and a CPU section 17.

The optical interface sections 11 and 12 are connected to the working line 40 and the protection line 41, respectively, and adapted to transmit and receive optical signals. The optical interface sections 13 and 14 are connected to the working line 44 and the protection line 45, respectively, and adapted to transmit and receive SONET signals. The switch section 15 is adapted to cross-connect the signals sent from the optical interface sections 11-14 and the RPR section 16.

The RPR section 16 is connected to an outside LAN. The RPR section 16 is adapted to convert LAN format signals sent from the LAN to SONET format signals to send the converted signals to the switch section 15, and convert SONET format signals sent from the switch section 15 to LAN format signals to send the converted signals to the LAN. The CPU section 17 controls the entire operations of the stations 10, 20, and 30.

<Operations Upon Occurrence of Failure>

In an RPR over SONET network operating at a path rate lower than a line rate thereof, the rate at which an interface section detects a path error (path error detection rate) is slower than the rate at which an optical interface detects a line error (line error detection rate) upon occurrence of a failure on a line. Accordingly, a path error is detected with a delay relative to detection of a line error. In an embodiment of the present invention, taking advantage of this detection time difference, a CPU section sends an RPR redundancy masking signal within the time period between the line error detection and the path error detection.

FIG. 4 is a block diagram illustrating operations performed upon occurrence of a failure in accordance with a redundancy controlling method of an embodiment of the present invention. In FIG. 4, components identical to those in FIG. 3 bear the same reference numerals. FIG. 5 is a signal timing chart for illustrating operations performed upon occurrence of a failure, wherein a line rate is OC-48 (about 2.5 Gbps), a path rate is STS-12C (about 600 Mbps), and a BER is $1\times10^{-5}$. Operations utilizing an RPR redundancy masking signal in accordance with an embodiment of the present invention are described with reference to (C)-(F) of FIG. 5, while operations utilizing no RPR redundancy masking signal are described with reference to (A) and (B) of FIG. 5 for ease of understanding.

Referring to FIGS. 4 and 5, a failure occurs on a working line 40 at time t0. About 8 ms later, at time t1, an optical interface section 11 detects a line error, such as light interruption, and switches a line error detection signal ((A) and (B) of FIG. 5) from low level to high level. In response to the line error detection signal, the optical interface section 11 switches an interruption signal ((D) of FIG. 5) to high level and sends the interruption signal to a CPU section 17 at time t2.

In response to the interruption signal, the CPU section 17 switches a line switching signal and an RPR redundancy masking signal ((E) of FIG. 5) to high level and sends the line switching signal to a switch section 15 and the RPR redundancy masking signal to an RPR section 16 at time t3. The switch section 15 enables a SONET redundancy function such that the connection to the RPR section 16 through the switch section 15 is switched from a working line 40 to a protection line 41. This switching operation takes about 20 ms, which is the time length between time t3 and time t5.

Figure 6B:
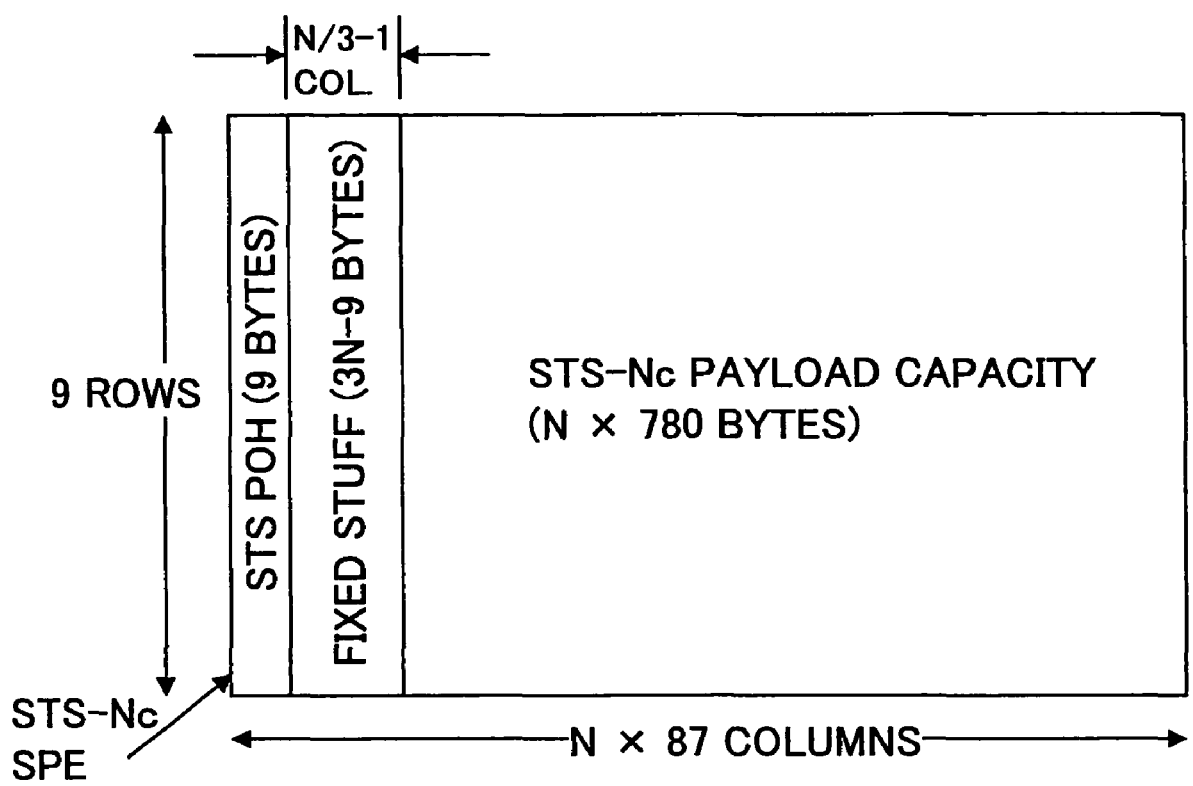
FIG. 6B illustrates an STS-Nc format.
Figure 6C:
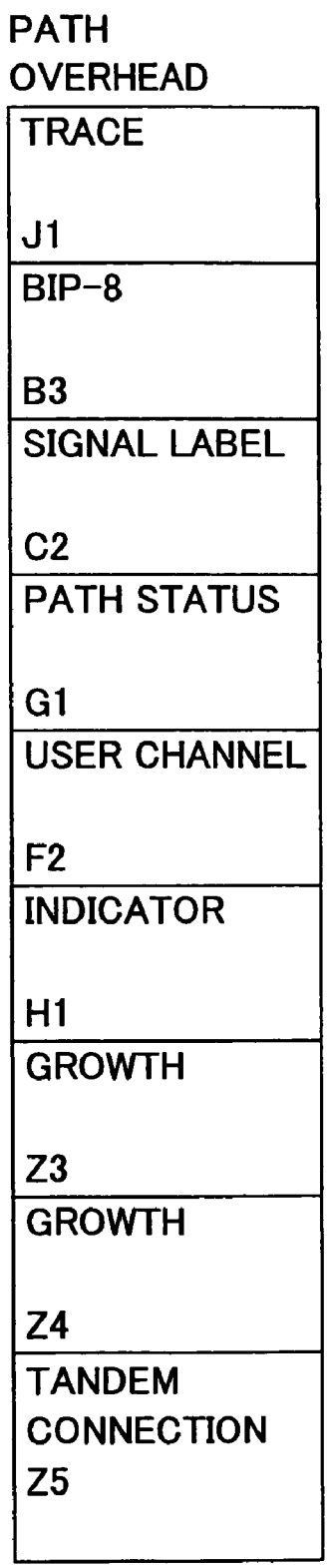
FIG. 6C illustrates a POH format.

The RPR section 16 is also adapted to terminate SONET format signals to perform path error detection using the B3 byte of POH (Path Overhead). FIGS. 6A, 6B, and 6C illustrate a SONET synchronous transport module STS-1 format, an STS-Nc format, and a POH format, respectively. An error detecting code BIP-8 (BIT Interleaved Parity-level 8) calculated over a payload area of a synchronous transport module of a previous frame is placed in the B3 byte of the POH. The RPR section 16 compares the calculated error detecting code BIP-8 with an error detecting code BIP-8 placed in the B3 byte of a synchronous transport module of the current frame to check for a difference, which indicates that a path error has occurred. In this way, the RPR section 16 detects the path error.

If no RPR redundancy signal is provided, unlike the illustrated embodiment of the present invention, the RPR section 16 detects a path error and switches a path error detection signal ((B) of FIG. 5) from low level to high level at time t4 about 25 ms after time t0. That is, the time difference between the path error detection and the line error detection is about 17 ms. However, in the illustrated embodiment of the present invention, since the CPU section 17 sends the RPR redundancy masking signal at time t3, the path error detection signal ((F) of FIG. 5) remains low level. Accordingly, the RPR redundancy function is not activated, and an RPR path is restored by the operations of the SONET redundancy function.

Figure 7A:
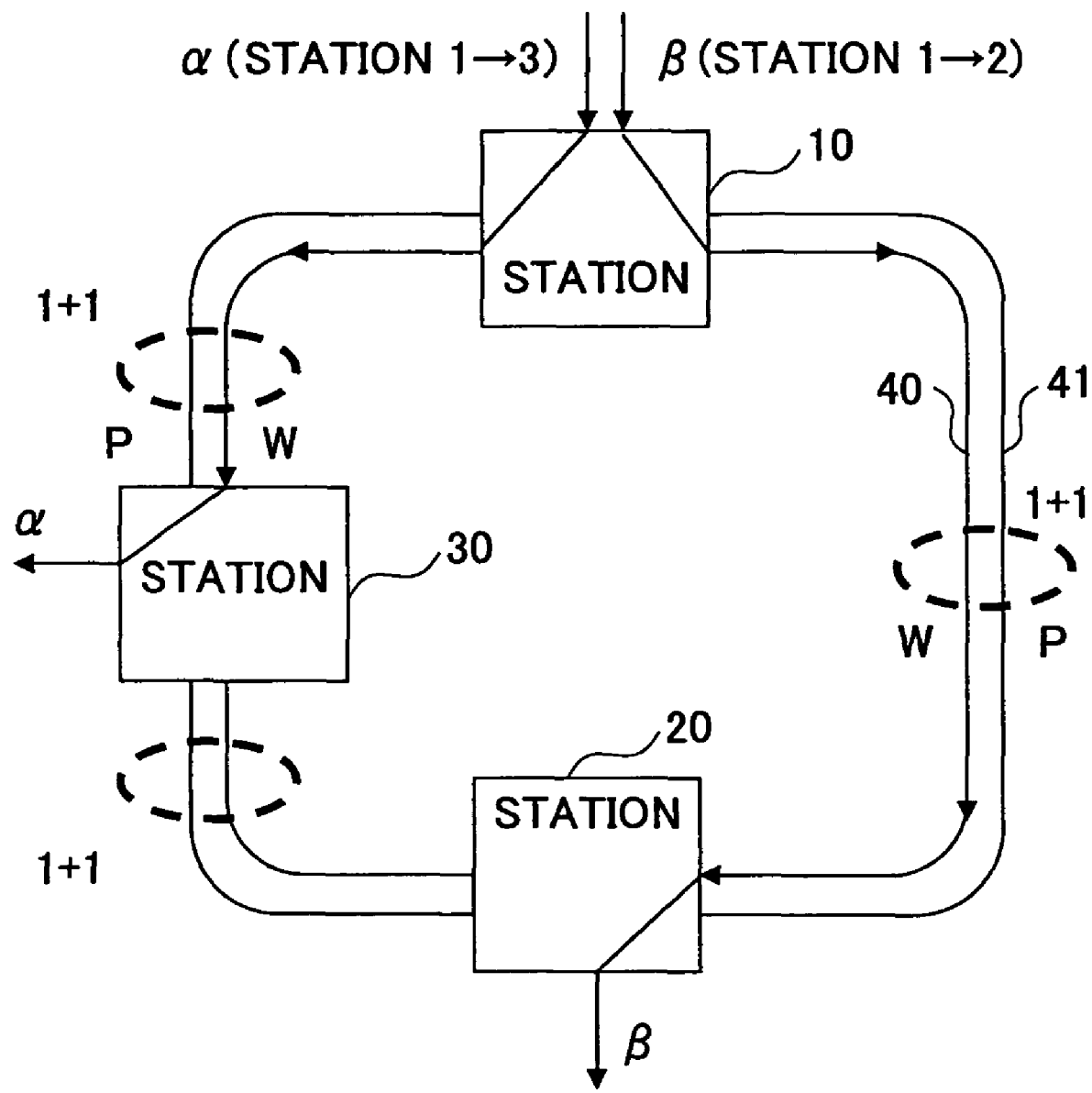
FIGS. 7A-7C are block diagrams illustrating redundancy operations performed in an RPR over SONET network according to an embodiment of the present invention.
Figure 7B:
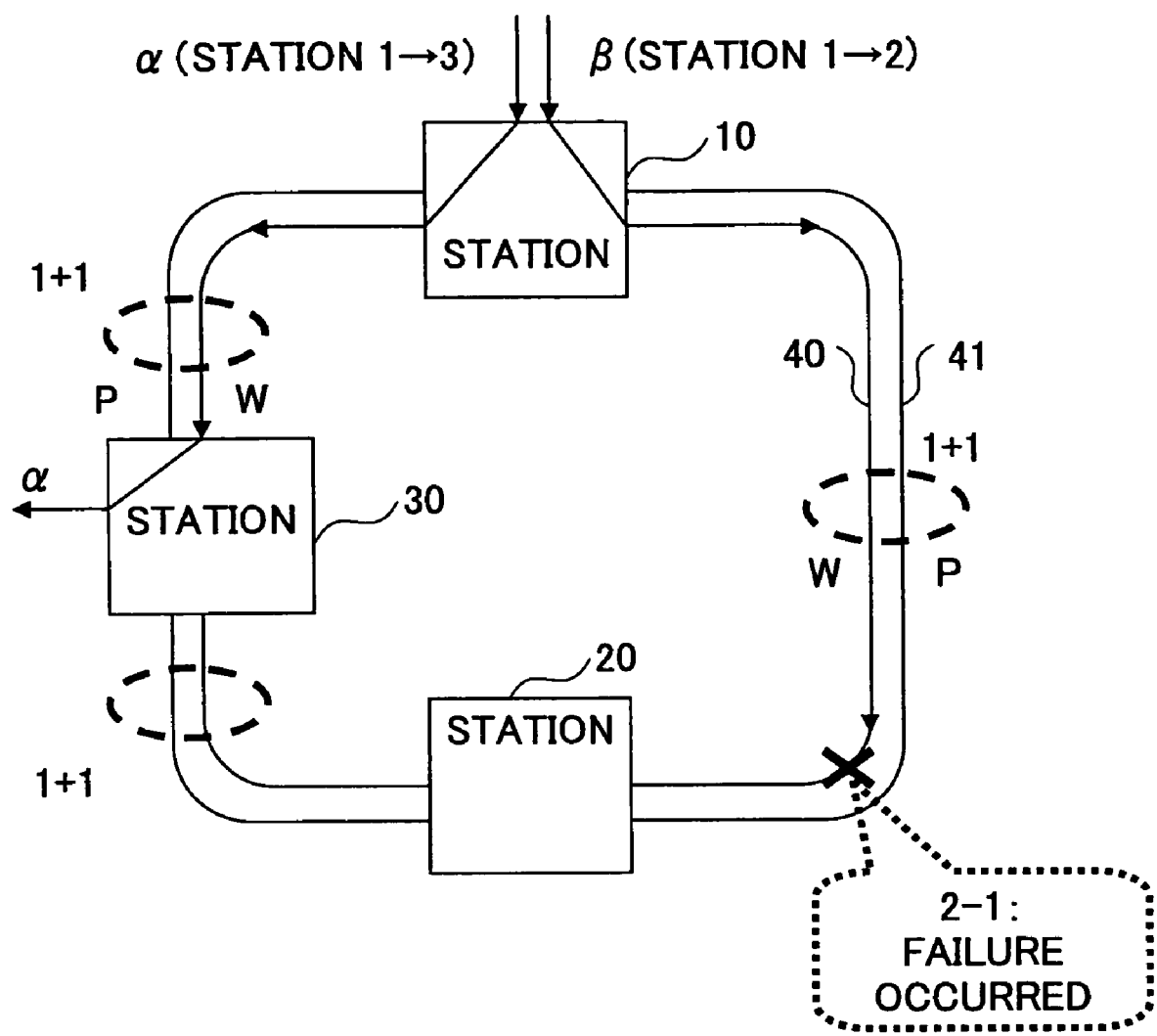
Figure 7C:
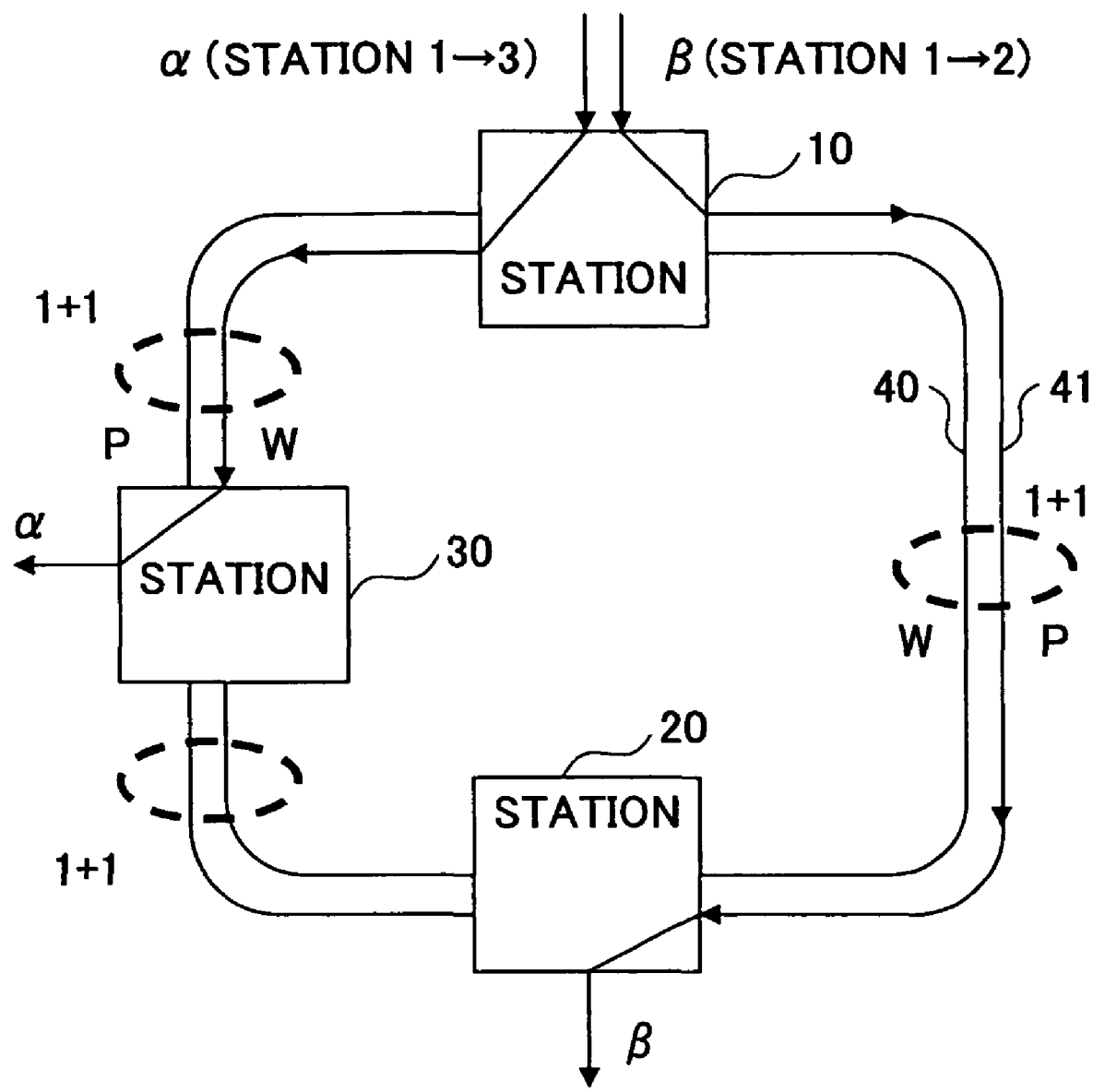

Referring to FIG. 7A, stations 10, 20, and 30 form a ring network through working (W) lines and protection (P) lines. The station 10 sends a data item α to the station 30, and a data item β to the station 20. In FIGS. 7A-7C, components identical to those in FIG. 3 bear the same reference numerals.

If a failure occurs on the working line 40 between the stations 10 and 20 as shown in FIG. 7B, the following operations are performed. In the station 20, an optical interface section 11 detects a line error on the working line 40 and reports the line error to a CPU section 17. The CPU section 17 activates a SONET redundancy function to send a line switching signal for switching connection of a switch section 15 from the optical interface section 11 for the working (W) line to an optical interface section 12 for the protection (P) line, and also send an RPR redundancy masking signal to an RPR section 16.

As a result, in the station 20, the SONET redundancy function is activated while an RPR redundancy function is not activated. The ring network therefore operates in a state shown in FIG. 7C, thereby preventing reduction of available bandwidth between the stations 10 and 30 and temporary signal interruption due to unwanted activation of the RPR redundancy function.

<Operations Upon Recovery from Failure>

Figure 8:
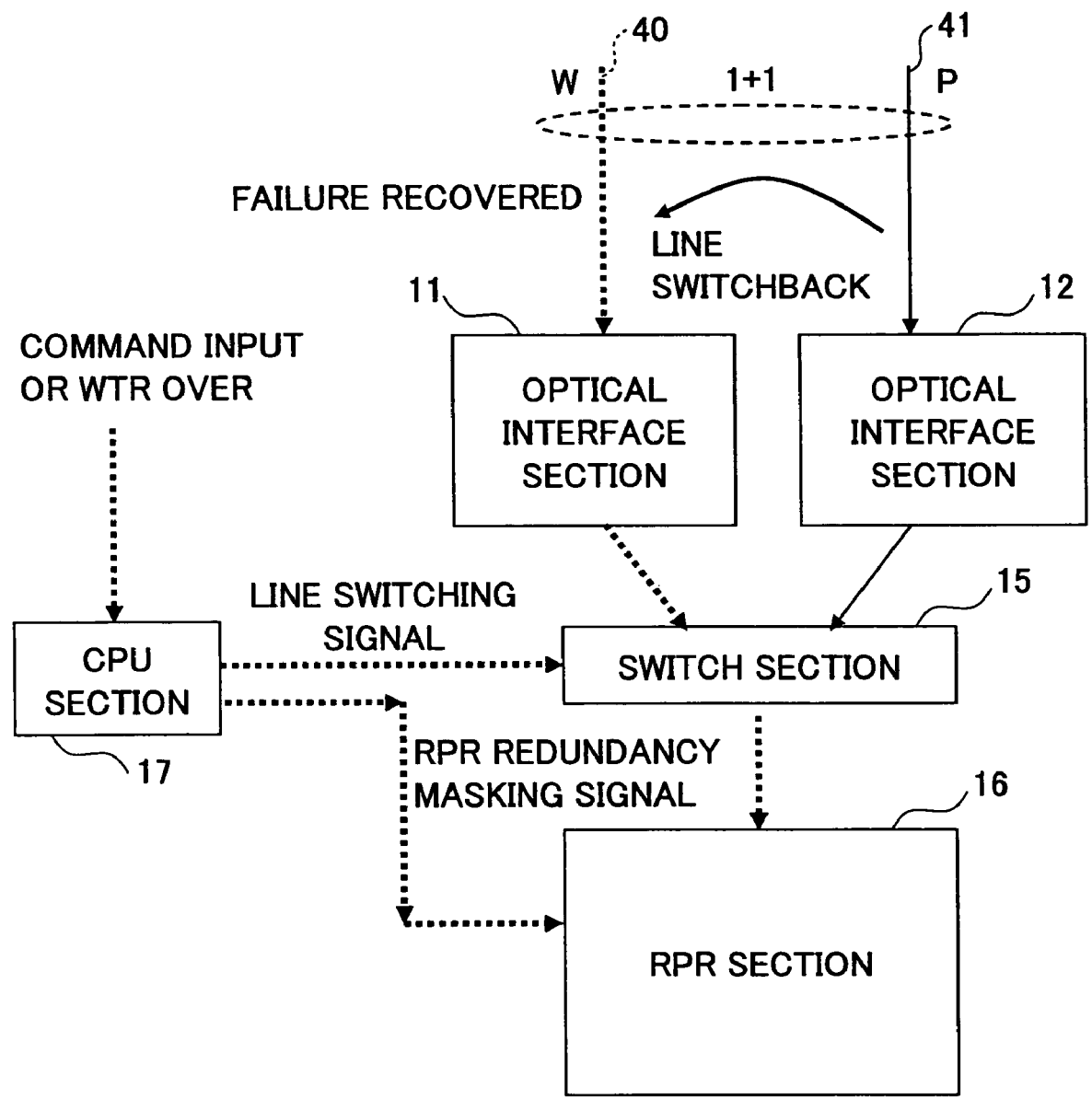
FIG. 8 is a block diagram illustrating operations performed upon recovery of a failure in accordance with a redundancy controlling method of an embodiment of the present invention.

FIG. 8 is a block diagram illustrating operations performed upon recovery from a failure in accordance with a redundancy controlling method of an embodiment of the present invention. In FIG. 8, components identical to those in FIG. 3 bear the same reference numerals. With reference to FIG. 8, when a command is input or when a WTR (Wait To Restore) state is over, a CPU section 17 generates a line switching signal that causes a switch section 15 to switch back the connection from an optical interface section 12 for a protection (P) line 41 to an optical interface section 11 for a working (W) line 40 and an RPR redundancy masking signal. The CPU section 17 sends the line switching signal to the switch section 15 and the RPR redundancy section to the RPR section 16.

In response to the line switching signal, the connection to the RPR section 16 is switched back by the switch section 15 from the optical interface section 12 for the protection (P) line 41 to the optical interface section 11 for the working (W) line 40. This switchback operation takes about 20 ms.

The RPR section 16 relocates the pointer contained in a SOH (Section OverHead) (FIG. 6A) that points to a start position of an STS-1 during the switchback operation from the optical interface section 12 to the optical interface section 11. The start position of the POH of the STS-1 SPE is changed by the relocation of the pointer, resulting in a difference between a calculated error detecting code BIP-8 for the current frame and an error detecting code BIP-8 of the following frame. This difference is detected as a path error.

The path error is detected about a dozen ms after the start of the switchback. Since the RPR redundancy masking signal is sent from the CPU section 17 to the RPR section 16 before the detection of the path error, a path error detection signal is not output. Accordingly, an RPR redundancy function is not activated.

<Operations Upon Occurrence of Double Failure>

Figure 9:
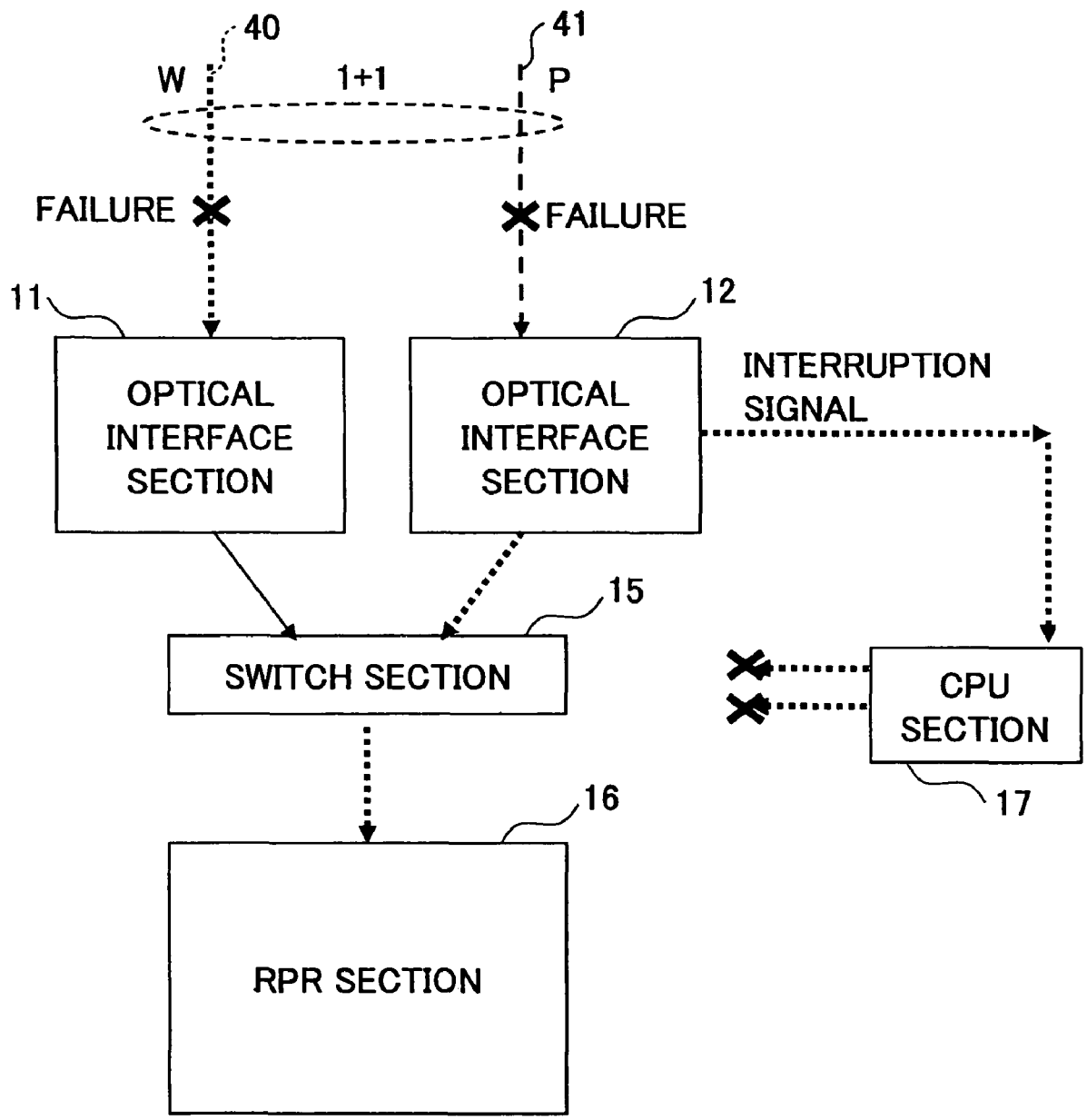
FIG. 9 is a block diagram illustrating operations performed upon occurrence of a double failure in accordance with a redundancy controlling method of an embodiment of the present invention.
Figure 10:
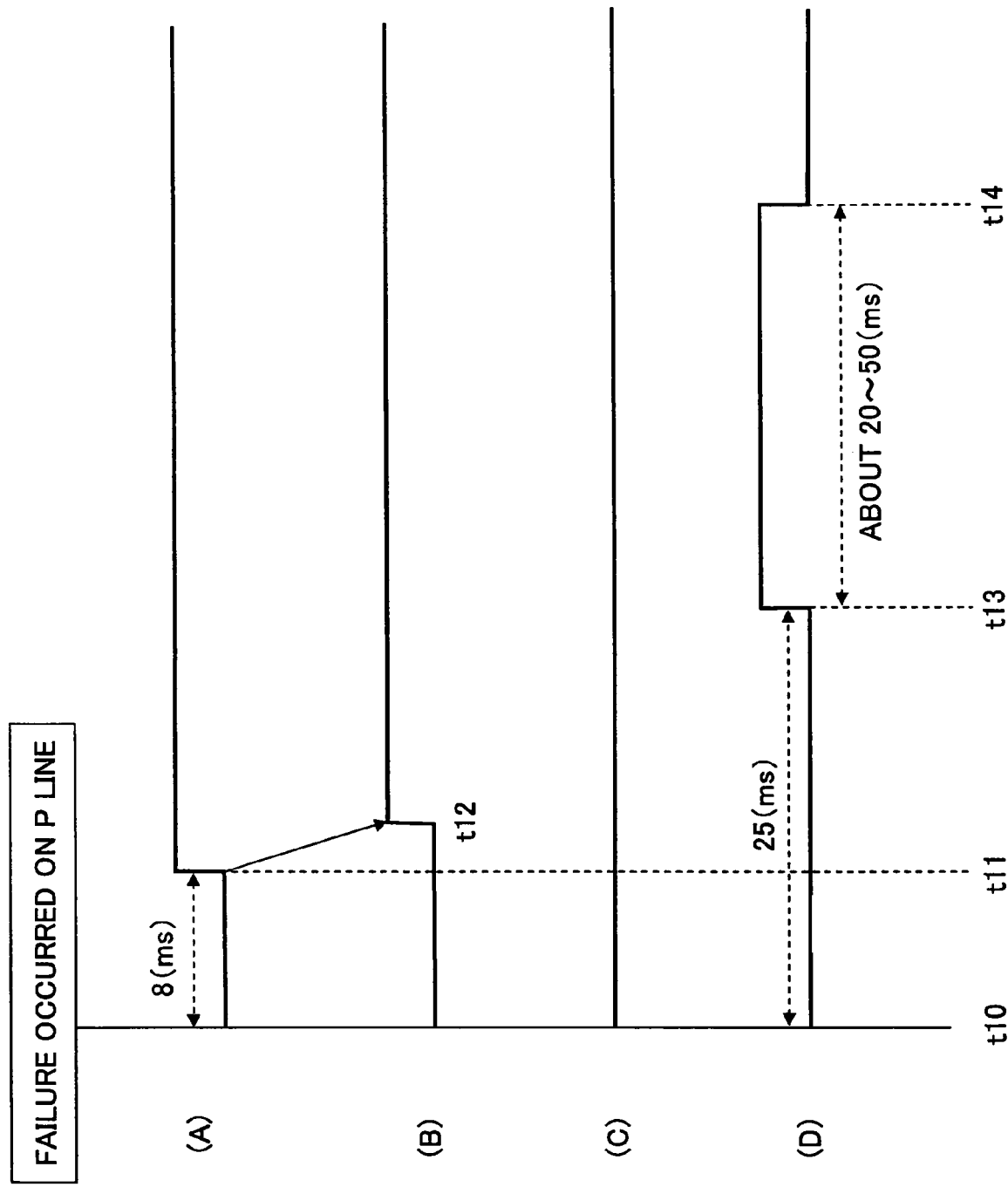
FIG. 10 is a signal timing chart for illustrating operations performed upon occurrence of a double failure.

FIG. 9 is a block diagram illustrating operations performed upon occurrence of a double failure in accordance with a redundancy controlling method of an embodiment of the present invention. In FIG. 9, components identical to those in FIG. 3 bear the same reference numerals. FIG. 10 is a signal timing chart for illustrating operations performed upon occurrence of the double failure, wherein a line rate is OC-48 (about 2.5 Gbps), a path rate is STS-12C (about 600 Mbps), and a BER is $1\times10^{-5}$.

With reference to FIG. 9, after a switching operation from a working line 40 having a failure to a protection line 41, a failure occurs on the protection line 41 at time t10. About 8 ms later, at time t11, an optical interface section 12 detects a line error indicating the failure on the protection line 41, such as light interruption, and switches a line error detection signal ((A) of FIG. 10) from low level to high level. In response to the line error detection signal, the optical interface section 12 switches an interruption signal ((B) of FIG. 10) to high level and sends the interruption signal to a CPU section 17 at time t12.

Since the CPU section 17 has already received an interruption signal from an optical interface section 11, the CPU section 17 recognizes occurrence of double failure upon receiving the interruption signal from the optical interface section 12. The CPU section 17 maintains a line switching signal and an RPR redundancy masking signal ((C) of FIG. 10) at low level, and stops outputting the line switching signal and the RPR redundancy masking signal.

As a result, the connection to an RPR section 16 is not switched by a switch section 15 from the optical interface section 12 for the protection line 41 to the optical interface section 11 for the working line 40. In other words, a SONET redundancy function is not activated.

Accordingly, the RPR section 16 detects a path error and switches a path error detection signal ((D) of FIG. 10) from low level to high level at time t13 about 25 ms after time t10. For example, if the working line 40 between the stations 10 and 20 fails as shown in FIG. 7B and the protection line 41 also fails in the state shown in FIG. 7C before the working line 40 is restored, the above-described RPR redundancy function switches a transmission route for the data item β to a route of the station 10—the station 30—the station 20. In the meantime, line and path recovery operations are performed.

<Another Operations Set Upon Occurrence of Failure>

Figure 11:
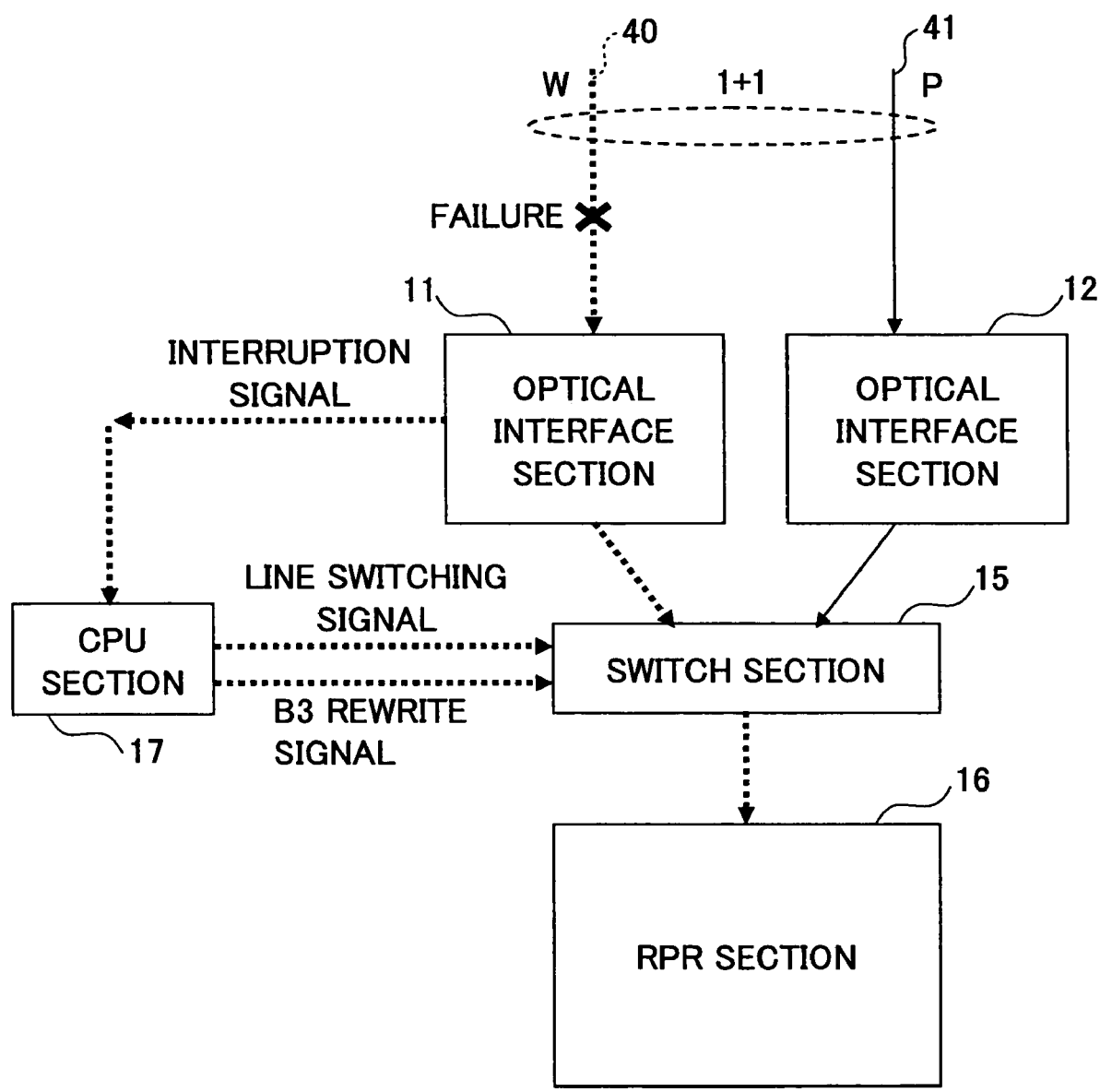
FIG. 11 is a block diagram illustrating another operations set performed upon occurrence of a failure in accordance with a redundancy controlling method of an embodiment of the present invention.

FIG. 11 is a block diagram illustrating another operations set performed upon occurrence of a failure in accordance with a redundancy controlling method of an embodiment of the present invention. In FIG. 11, components identical to those in FIG. 3 bear the same reference numerals. With reference to FIG. 11, when a failure occurs on a working line 40, an optical interface section 11 detects a line error, such as light interruption, and switches a line error detection signal from low level to high level. The optical interface section 11 generates an interruption signal in accordance with the line error detection signal, and sends the interruption signal to a CPU section 17.

The CPU section 17 generates a line switching signal and a B3 rewrite signal, and sends the line switching signal and the B3 rewrite signal to a switch section 15. Then, the switch section 15 enables a SONET redundancy function such that connection to an RPR section 16 is switched from the optical interface section 11 for the working line 40 to an optical interface section 12 for a protection line 41. Further, the switch section 15 calculates an error detecting code BIP-8 over a payload area of a received synchronous transport module, and rewrites a B3 byte of a synchronous transport module of the following frame based on the calculated error detecting code BIP-8.

The RPR section 16 compares a calculated error detecting code BIP-8 with an error detecting code BIP-8 of the following frame, and determines that there is no difference. Therefore, the RPR section 16 detects no path error and outputs no path error detection signal. Accordingly, an RPR redundancy function is not activated, and an RPR path is restored by the SONET redundancy function.

RPR over SONET ring networks are often operated at a path rate lower than a line rate thereof, for example, at a line rate of OC (Optical Carrier)-192, 48, and a path rate of STS-1, 3, 12. In an aspect of the present invention, since unwanted activation of the RPR redundancy function in RPR over SONET networks does not occur after switching operations due to a line failure and after switchback operations due to recovery of a line, efficient use of the bandwidth in the RPR and prevention of unnecessary signal interruption can be achieved. On the other hand, the RPR redundancy function activates in the event of a double failure, thereby ensuring network reliability.

While 1+1 SONET redundancy functions are used in the illustrated embodiments, the same effects are achieved in BLSR (Bi-directional Line Switched Ring) because line switching operations in BLSR are performed in the same manner. It is understood that the present invention is not limited to the above embodiment.

The above embodiments employ the optical interface sections 11-14 as components corresponding to a line error detecting unit in the appended claims, the switch section 15 as a component corresponding to a switching unit and as a component corresponding to a data rewrite unit, the RPR section 16 as a component corresponding to a path error detecting unit, and the CPU section 17 as a component corresponding to a masking unit.

The present application is based on Japanese Priority Application No. 2005-285421 filed on Sep. 29, 2005, with the Japanese Patent Office, the entire contents of which are hereby incorporated by reference.

What is claimed is:

1. A redundancy controlling method of a transmission device for controlling a first redundancy function that switches between a working line and a protection line in response to a detection of a line error and a second redundancy function that performs a path switching in response to a detection of a path error in a ring network operating at a path rate lower than a line rate thereof, the redundancy controlling method comprising:
  detecting, by a line error detector of the transmission device, a line error occurring on either the working line or the protection line;
  enabling, by a switch of the transmission device, the first redundancy function to switch the working line to the protection line in response to the detection of the line error on the working line;
  detecting, by a path error detector of the transmission device, a path error in a signal output from the switch immediately after a time of the detection of the line error on the working line; and
  outputting, by a masking unit of the transmission device, a masking signal that masks the path error detection to the path error detector for a period after the time of the detection of the line error and before an expected time of the detection of the path error so that the path switching by the second redundancy function is stopped during the period.

2. The redundancy controlling method as claimed in claim 1, further comprising:
  stopping, when a line error is detected on the protection line after the working line is switched to the protection line by the first redundancy function, masking the path error detection so that the second redundancy function is enabled to perform the path switching.

3. A transmission device for use in a ring network operating at a path rate lower than a line rate thereof, having a first redundancy function that switches between a working line and a protection line in response to a detection of a line error, and a second redundancy function that performs a path switching in response to a detection of path error, the transmission device comprising:
  a line error detector to detect a line error occurring on either the working line or the protection line;
  a switch to enable the first redundancy function to switch the working line to the protection line in response to the detection of the line error on the working line;

a path error detector to detect a path error in a signal output from the switch immediately after a time of the detection of the line error on the working line; and a masking unit to output a masking signal that masks the path error detection to the path error detector for a period after the e time of the detection of the line error on the working line by the line error detector and before an expected time of the detection of the path error by the path error detector so that the path switching by the second redundancy function is stopped during the period.

4. The transmission device as claimed in claim 3, wherein the masking unit outputs the masking signal that masks the path error detection to the path error detector for a period after a start time of the switching and before an expected time of the detection of the path error by the path error detector when the switch switches the protection line back to the working line.

5. The transmission device as claimed in claim 3, wherein, when the line error detector detects a line error on the protection line after the working line is switched to the protection line by the switch, the masking unit stops outputting the masking signal to the path error detector so that the second redundancy function is enabled to perform the path switching.

6. The transmission device as claimed in claim 3, further comprising:

a data rewriter to recalculate, when the working line is switched to the protection line in response to the detection of the line error on the working line, a path error detecting data element contained in a path overhead of a data module from the protection line so that the path error detecting data element is reset to an error-free value, and to send the data module to the path error detector.

\* \* \* \* \*